United States Patent
Pletea et al.

(10) Patent No.: US 11,522,868 B2
(45) Date of Patent: Dec. 6, 2022

(54) IDENTIFYING A NETWORK NODE TO WHICH DATA WILL BE REPLICATED

(71) Applicant: KONINKLIJKE PHILIPS N.V., Eindhoven (NL)

(72) Inventors: Daniel Pletea, Eindhoven (NL); Peter Petrus van Liesdonk, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 863 days.

(21) Appl. No.: 16/317,720

(22) PCT Filed: Jul. 27, 2017

(86) PCT No.: PCT/EP2017/068987
§ 371 (c)(1),
(2) Date: Jan. 14, 2019

(87) PCT Pub. No.: WO2018/019928
PCT Pub. Date: Feb. 1, 2018

(65) Prior Publication Data
US 2019/0230094 A1  Jul. 25, 2019

Related U.S. Application Data

(60) Provisional application No. 62/511,376, filed on May 26, 2017, provisional application No. 62/367,705, filed on Jul. 28, 2016.

(51) Int. Cl.
*H04L 9/40* (2022.01)
*G06F 16/182* (2019.01)
(Continued)

(52) U.S. Cl.
CPC ............ *H04L 63/107* (2013.01); *G06F 9/542* (2013.01); *G06F 16/1844* (2019.01);
(Continued)

(58) Field of Classification Search
CPC .............. H04L 63/107; H04L 63/0428; H04L 63/0435; H04L 9/0819; G06F 16/1844; G06F 9/542
See application file for complete search history.

(56) References Cited

U.S. PATENT DOCUMENTS 6,289,450 B1 * 9/2001 Pensak ................ H04L 63/0428
713/167
8,984,621 B2 * 3/2015 Burch ..................... G06F 21/33
726/15
(Continued)

FOREIGN PATENT DOCUMENTS

CN    104168108 A  * 11/2014
EP    2879323 A1    6/2015
(Continued)

OTHER PUBLICATIONS

Joakim Borgh, Attribute-Based Encryption in Systems with Resource Constrained Devices in an Information Centric Networking Context, 2016, UPPSLA Universitet. pp. 1-34. (Year: 2016).*
(Continued)

*Primary Examiner* — Shin-Hon (Eric) Chen
*Assistant Examiner* — Abdullah Almamun

(57) ABSTRACT

A method performed by a device for identifying a network node within a network to which data will be replicated is disclosed. The method comprises encrypting a session key according to an attribute-based encryption scheme; broadcasting the encrypted session key within the network; receiving at least one message encrypted using the session key from at least one network node within the network; and selecting a network node from the at least one network node to which data will be replicated. A further method, a device and a non-transitory machine-readable medium are also disclosed.

10 Claims, 6 Drawing Sheets

(51) Int. Cl.
*G06F 9/54* (2006.01)
*H04L 9/08* (2006.01)

(52) U.S. Cl.
CPC ........ *H04L 9/0819* (2013.01); *H04L 63/0428* (2013.01); *H04L 63/0435* (2013.01)

(56) References Cited

U.S. PATENT DOCUMENTS

| | | | |
|---|---|---|---|
| 9,479,502 B2* | 10/2016 | Houston | H04L 63/205 |
| 10,223,543 B1* | 3/2019 | Mohen | H04L 63/0428 |
| 11,025,688 B1* | 6/2021 | Ijjurouthu | H04L 63/08 |
| 2006/0206934 A1* | 9/2006 | Ammirata | H04L 63/0272 726/15 |
| 2007/0234102 A1 | 10/2007 | Fan et al. | |
| 2011/0072206 A1 | 3/2011 | Ross | |
| 2013/0202111 A1* | 8/2013 | El Gamal | H04W 12/033 380/270 |
| 2015/0134723 A1* | 5/2015 | Kansal | H04L 67/1031 709/203 |
| 2016/0171238 A1 | 6/2016 | Sibillo | |
| 2016/0255056 A1* | 9/2016 | Shalunov | H04L 51/12 713/168 |
| 2016/0306751 A1* | 10/2016 | Amarendran | G06N 20/00 |
| 2016/0359684 A1 | 12/2016 | Rizqi et al. | |
| 2017/0070485 A1* | 3/2017 | Kumar | H04L 9/3066 |
| 2018/0375841 A1* | 12/2018 | Tola | H04L 67/2833 |
| 2019/0278483 A1* | 9/2019 | Mahmood | G06F 3/067 |

FOREIGN PATENT DOCUMENTS

| | | |
|---|---|---|
| JP | 2006155082 A | 6/2006 |
| JP | 2012043224 A | 3/2012 |
| WO | 2009137927 A1 | 11/2009 |

OTHER PUBLICATIONS

Paladi, et al., "Trusted Geolocation-Aware Data Placement in Infrastructure Clouds", IEEE 13th International Conference on Trust, Security and Privacy in Computing and Communications, Sep. 24-26, 2014, 9 pages (Abstract).

Wang, C. et al., "Implementing a Personal Health Recod Cloud Platform Using Ciphertext-Policy Attribute_Based Encryption," 2012 Fourth International Conference on Intelligent Networking and Collaborative Systems, p. 8-14.

* cited by examiner

IDENTIFYING A NETWORK NODE TO WHICH DATA WILL BE REPLICATED

CROSS-REFERENCE TO PRIOR APPLICATIONS

This application is the U.S. National Phase application under 35 U.S.C. § 371 of International Application No. PCT/EP2017/068987, filed on Jul. 25, 2017, which claims the benefit of both U.S. Provisional Application No. 62/511,376, filed May 26, 2017 and U.S. Provisional Application No. 62/367,705, filed Jul. 28, 2016. These applications are hereby incorporated by reference herein, for all purposes.

TECHNICAL FIELD

Various embodiments described herein relate to data replication and more particularly, but not exclusively, data replication across a network.

SUMMARY

Nowadays connected health systems are able to deliver, via collaborations, enhanced and more efficient care for the patients. In such systems, healthcare moves outside hospitals, closer to the analysis tools that extract more and smarter knowledge from this data. These types of analyses make the healthcare tailored to a patient and therefore more accurate.

The empowering/enablement of the healthcare tools and ultimately of the patients requires the data to be replicated in multiple data storages across the world (on different platforms). Data is replicated in different storage media across the world due to requirements regarding data query performance, load balancing and disaster recovery. Replication can be straightforward when the data can be stored in any storage medium from any geographical location (e.g. country or continent), but this is often not the case in the real world, where the data storage platforms need to adhere to different geolocation directives, regulations or requirements imposed by governmental entities and to other requirements defined by customers or end-users. For example, under regional restrictions, data may not be free to flow from one region or country to another. Such restrictions might be dictated by policies of one or more countries, from collaboration agreements or even by the owners of the data (e.g. patients).

This situation is further complicated by the increasing reliance on cloud-based computing systems, such as virtual machines. Geolocation requirements may be present in such connected health platforms, where multi-tenant, multi-datacenter data management needs to enforce geolocation requirements, such as:

Parts of the data should be managed globally (e.g. master data, service configurations, authentication sources);
Parts of the data should remain "local" (local could be: on-premise or within a defined geographical region);
Data must stay in Germany if the tenant is a German customer;
Data must be isolated according to the tenant (e.g. in a multi-tenancy scenario);
Data must all be kept in one database;
Data must be restricted to schemas/databases per tenant.

In addition to, or instead of one or more of these geolocation requirements, other geolocation requirements may exist, such as:

Location-awareness: Users should be aware of the physical location of execution environments (EEs) that process users' data;
Location-control: Users should be able to define the set of possible physical locations, at country level, where users' data may be processed.

Storing data only in allowed geographical places can be easy to enforce when the connected health platform is storing and managing the data within a single data storage provider (e.g. a single cloud provider). In such a case, the cloud provider has control over all of the computer systems and/or virtual machines (VMs) used for deployment of the aforementioned platform and knows where all of the computer systems and/or VMs and their attached data storage media are placed.

This scenario becomes a lot more complex in scenarios where the platform spans a multitude of cloud providers over multiple locations, or when several on-premise hospital systems are part of the aforementioned connected health platform. In this case, multiple computer systems/VMs belonging to different computing providers are connected and, therefore, a centralized solution for replication becomes more difficult to design because of the synchronization across computing providers. The configuration of the deployed computer systems/VMs is dynamic in such a connected health system, with computer systems and VMs being deployed in or removed from different computing platforms due to different requirements (e.g. availability, backup procedures, or new services). In this case a discovery solution which is able to adapt to the dynamicity of the system needs to be in place.

One solution is to encrypt the data and broadcast it all over a network with data being encrypted such that only those computer systems or VMs that are allowed to decrypt it can do so. Such a solution alone can be inefficient when the size of the data that needs to be replicated is big, which is often the case in connected health systems. Another solution is to have a central broker which maintains lists of the resources within the connected health system. However, platforms are dynamic, making such lists difficult to maintain in some cases. In such a scenario, all of the computing providers would have to communicate and synchronize their resources/VMs lists and their geographical locations, which ultimately would also have to be trusted.

Default solutions for the problem of data replication under various restrictions, such as geolocation restrictions, may involve setting up a secure tunnel (e.g. a virtual private network, VPN) between the origin of the data and the place where the data needs to be replicated. A first step requires the discovery of candidate resources where the data can be replicated; a second step involves authentication of the discovered resources; a third steps consists of setting up a session key between the origin and the newly discovered resource where the data can be replicated. In most of the cases the second and the third step are together part of an authenticated key agreement protocol. Such protocols use a public-key infrastructure for authentication or a pre-shared symmetric key. Here, replication restrictions (e.g. geolocation restrictions) would be enforced via out-of-band communication regarding which servers can be trusted with what data.

There appear to be no authenticated key agreement protocols that provide geolocation. A hurdle to providing such a protocol is that geolocation authentication solutions are not very developed; one solution is the use of internet protocol (IP) address authentication, but this can be imprecise and easily spoofed in some cases.

Accordingly, various embodiments described herein enable secure authenticated discovery of resources where data can be replicated while enforcing the particular policy requirements, regulations and directives. As mentioned above, steps which have been proposed to solve this problem are, in order: discovery (based on IP addresses), authentication (which would require a public-key cryptography infrastructure), and negotiation of a symmetric key. Various embodiments disclosed herein combine all this in a more efficient and secure solution.

Various embodiments use multi-authority, attribute-based encryption, which uses particular attributes for authenticating the nodes of a network. For example, a geolocation attribute may be used to authenticate nodes that are located in allowed geographical places, where data can be replicated. Servers receive private keys from regional authorities that can certify their geographic location.

A computer system or VM in a network may be authenticated by being challenged to decrypt a session key. If the computer system or VM is located in a geographical location in which data replication from the origin device is allowed, independent of the cloud provider or hospital local server, then it will be able to decrypt the session key and becomes a candidate for replication.

In some examples, the session keys and/or their respective secure tunnels may have expiration dates. This contributes to the security of the system, since the encryption key changes periodically. Furthermore this expiration forces re-discovery of new devices/VMs for replication, which keeps the system fresh and adapts to the dynamicity of the connected health system.

The solution may, in some examples, make use of a public-key infrastructure, where the type of encryption is attribute-based. In some examples, in order to fit the geolocation replication exemplified above, geolocation is one of the attributes. An example of a policy involving geolocation attributes is: (US, DE, !CN). According to this example policy, data can be replicated in the United States and in Germany, but not in China. Such policies are already in use without cryptographic enforcement, like in the 'cdmi_geographic_placement' field in the Cloud Data Management Interface (CDMI) specification.

In some embodiments, successful usage depends on all of the servers getting correct private keys for their relevant attributes. This may involve a certification process, where various authorities are responsible for different attributes. As an example, the attribute 'US' associated with a server declares that the server is physically located in the United States. In this example, there may exist a key authority in the United States that has a certification process which checks whether servers are physically located in that country. Once this certification is complete, the key authority may provide the servers with a private key from a multi-authority, attribute-based encryption scheme. A private key provided to a server allows it to decrypt ciphertext which includes 'US' in the policy. Similar authorities may exist for the other countries involved, where an attribute for one country (e.g. 'US') can be observed as a negative for any other country (e.g. '!CN'). To prevent this key from being copied to other servers, the key may be stored on a smartcard or a hardware dongle, for example. In other examples, authorities may exist which can provide keys based on a different attribute, relating, for example, to a legal requirement or restriction. As an example, a global organization may evaluate datacenters for compliance with the Health Insurance Portability and Accountability Act of 1996 (HIPAA), then provides a key based on a 'HIPAA' attribute.

The present disclosure relates to a method performed by a device for identifying one or more virtual machine (VMs) to which data will be replicated. The device performing the method may be a virtual machine. The method comprises: encrypting a session key according to an attribute-based encryption scheme, wherein an attribute used for encrypting the session key comprises a geolocation policy specifying one or more geographic locations; broadcasting the encrypted session key within a network domain; receiving at least one message encrypted using the session key from at least one VM within the network domain; and selecting a VM from the at least one VM to which data will be replicated.

The geolocation policy identifies at least one of the one or more geographic locations as being a location where the data is allowed to be replicated. The geolocation policy identifies at least one of the one or more geographic locations as being a location where the data is not allowed to be replicated.

The method further comprises receiving a message from a different VM within the network domain indicating that the encrypted session key was unable to be decrypted by the different VM.

The steps of encrypting and broadcasting may be performed in response to expiration of at least one secure tunnel within the network domain.

The present disclosure also relates to a device comprising: a communications interface, a memory, and a processor configured to perform the method described above.

The present disclosure also relates to a non-transitory, machine-readable medium encoded with instructions for execution by a processor, the non-transitory machine-readable medium comprising instructions for performing the method described above.

The present disclosure also relates to a method performed by a virtual machine (VM) for facilitating data replication within a network domain, the method comprising: receiving a message from an origin device, wherein the message includes a session key that is encrypted according to an attribute-based encryption scheme, wherein an attribute used for encrypting the session key comprises a geolocation policy specifying one or more geographic locations; attempting to decrypt the message using a policy key, wherein the policy key is specific to a geographic location in which the VM is located; encrypting a return message according to the policy key; and transmitting the return message back to the origin device.

The method may further comprise: determining whether the attempt to decrypt the message was successful; and transmitting, to the origin device, an indication that decryption was unsuccessful when it is determined that the attempt was unsuccessful, wherein the steps of encrypting and transmitting the return message are performed when it is determined that the attempt was successful.

The method may further comprise: identifying a key server assigned to the geographic location in which the VM is located; authenticating with the key server; and receiving the policy key from the key server.

The method may further comprise: receiving data to be replicated from the origin device; and storing the data to be replicated for later access.

The present disclosure also relates to a device comprising: a communications interface, a memory, and a processor configured to perform the method described above.

The present disclosure also relates to a non-transitory machine-readable medium encoded with instructions for execution by a processor, the non-transitory machine-readable medium comprising instructions for performing the method described above.

In the present disclosure, computer systems and/or virtual machines within a network may be considered to be located at nodes of the network. Network nodes may be connected to one another wirelessly (e.g. in a cloud environment), or via a wired connection (e.g. within a wired network).

According to a first aspect, the present invention provides a method performed by a device for identifying a network node within a network to which data will be replicated, the method comprising: encrypting a session key according to an attribute-based encryption scheme; broadcasting the encrypted session key within the network; receiving at least one message encrypted using the session key from at least one network node within the network; and selecting a network node from the at least one network node to which data will be replicated.

The at least one network node may comprise at least one virtual machine. In some embodiments, the device performing the method may comprise processing apparatus, and/or a virtual machine.

An attribute used for encrypting the session key may comprise a geolocation policy specifying one or more geographic locations. In some embodiments, the geolocation policy may identify at least one of the one or more geographic locations as being a location where the data is allowed to be replicated. The geolocation policy may identify at least one of the one or more geographic locations as being a location where the data is not allowed to be replicated.

The method may further comprise: receiving a message from a particular network node within the network, other than the selected network node, the message indicating that the encrypted session key could not be decrypted by the particular network node.

The steps of encrypting and broadcasting may be performed in response to the expiration of at least one secure tunnel within the network.

According to a second aspect, the present invention provides a method, performed by processing apparatus at a network node, for facilitating data replication within a network, the method comprising: receiving a message from an originating device, wherein the message includes a session key that is encrypted according to an attribute-based encryption scheme; attempting to decrypt the message using a policy key; determining whether the attempt to decrypt the message was successful; and responsive to determining that the attempt to decrypt the message was successful: encrypting a return message according to the policy key; and transmitting the return message to the originating device.

In some embodiments, the method of the second aspect may be performed by a virtual machine.

The method may further comprise: responsive to determining that the attempt to decrypt the message was unsuccessful: transmitting, to the originating device, an indication that decryption was unsuccessful.

In some embodiments, an attribute used for encrypting the session key may comprise a geolocation policy specifying one or more geographic locations. The policy key may be specific to a geographic location in which the processing apparatus is located.

The method may further comprise: identifying a key server assigned to the geographic location in which the processing apparatus is located; authenticating with the key server; and receiving the policy key from the key server.

The method may further comprise: receiving data to be replicated from the originating device; and storing the data to be replicated for later access.

According to a third aspect, the present invention provides a device comprising a communications interface, a memory, and a processor. The processor is configured to perform a method according to the first aspect above and/or a method according to the second aspect above.

According to a fourth aspect, the present invention provides a non-transitory machine-readable medium encoded with instructions for execution by a processor, the non-transitory machine-readable medium comprising instructions for performing a method according to the first aspect above and/or a method according to the second aspect above.

Other features of the invention will be apparent from the following description.

BRIEF DESCRIPTION OF THE DRAWINGS

In order to better understand various example embodiments, reference is made to the accompanying drawings, wherein.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
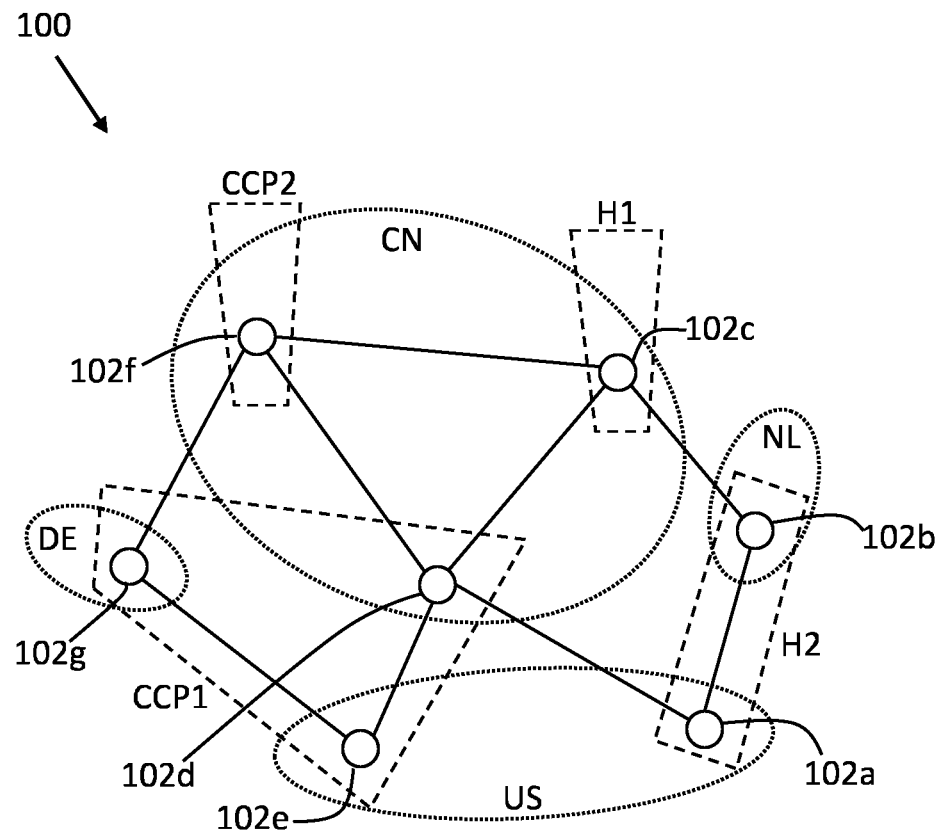
FIG. 1 is an illustration showing an example of a network containing a plurality of nodes.

The invention may be implemented in a computer network spanning multiple rooms, departments, buildings, organizations, countries and/or continents. An example network 100 is shown in FIG. 1. The network 100 includes various nodes 102a-g, each of which is located within one or more buildings, organizations or cloud computing platforms, such as a hospital building (H1 or H2), or a cloud computing platform (CCP1 or CCP2). The nodes 102 are also distributed throughout various countries, including the United States (US), the Netherlands (NL), Germany (DE) and China (CN). In the example shown in FIG. 1, some of the nodes are connected to one another. In other examples, different connections may exist. For example, the network node 102b is within a network of a hospital or hospital group, H2, and is located in the Netherlands, while the network node 102a is within the same hospital group, H2, as the network node 102b, but is located in the United States.

In an example, the node 102a may serve as an originating node, or origin node, which contains data (e.g. medical data relating to a patient) to be replicated at one or more other nodes within the network. The data may be subject to one or more restrictions regarding replication, which may be set out in one or more policies. For example, the data may be subject to a geolocation policy, such as "(US, DE, !CN)", indicating that the data may be replicated at nodes within the US and Germany, but not at nodes within China. Under such a policy, the data from the originating node 102a may be replicated at the nodes 102e and 102g, but not at the nodes 102b, 102c, 102d or 102f.

Figure 2:
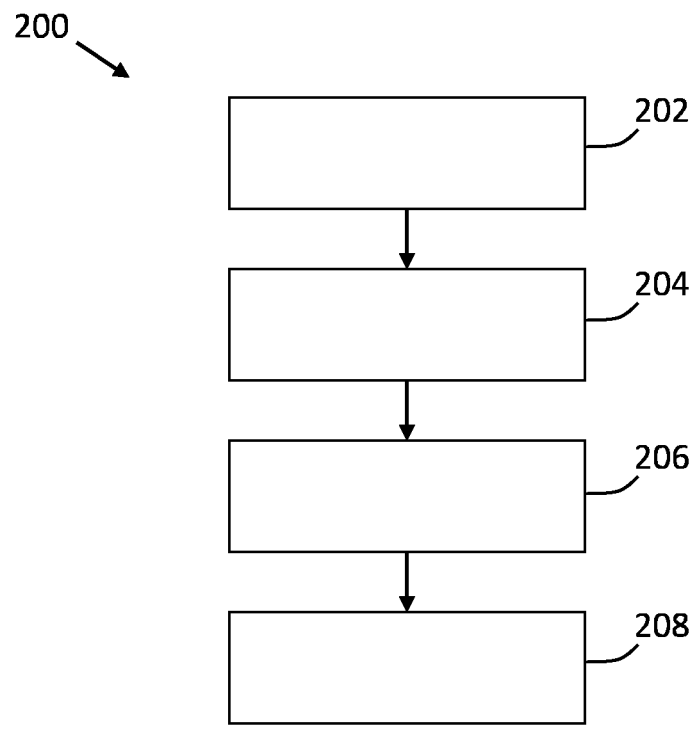
FIG. 2 is a flowchart showing an example of a method, capable of being performed by an originating device, for identifying a network node within a network.

FIG. 2 is a flowchart showing an example of a method 200 for identifying a network node within a network to which data will be replicated. The method may be performed by a device containing data to be replicated. The device performing the method 200 may be referred to as an originating device, or an origin device, since this device is where the data to be replicated may originate. The originating device may be processing apparatus, a computing device or a virtual machine, and the originating device may be referred to as an originating node. As will be appreciated, the data to be replicated may, in some embodiments originate elsewhere, and be transmitted from the originating device. The method 200 comprises, at step 202, encrypting a session key according to an attribute-based encryption scheme. The session key may be encrypted using known means. For example, the encryption step may involve randomly selecting a bit string that qualifies as a symmetric encryption session key and encrypting the bit string according to an attribute-based encryption scheme. The session key may be encrypted using any attribute, for example an attribute relating to a node to which data may be replicated. In some examples, an attribute used to encrypt the session key may be a geolocation attribute. Thus, the attribute used for encrypting the session key may comprise a geolocation policy specifying one or more geographic locations. In some embodiments, the geolocation policy may identify at least one of the one or more geographic locations as being a location where the data is allowed to be replicated. In some embodiments, the geolocation policy may identify at least one of the one or more geographic locations as being a location where the data is not allowed to be replicated.

As used herein, the term 'geolocation' is intended to refer to a real-world geographic location, such as the location of a network node at which the data is to be replicated. Depending on the required accuracy, the geolocation may be defined in terms of coordinates, a grid reference, a building, a street, a city, a country or a continent. In other examples, the session key may be encrypted using a different attribute. For example, the session key may be encrypted using an attribute based on an office number, a department of a company or organization, or the company or organization itself.

The at least one network node may, in some examples, comprise at least one virtual machine.

At step 204, the method 200 comprises broadcasting the encrypted session key within the network. The encrypted session key may be broadcast using any suitable known means. For example, the key may be transmitted via a network broadcast or a network multicast.

Once the encrypted session key has been broadcast to nodes within the network, an attempt may be made at each node to decrypt the session key, as is described below.

The method 200 comprises, at step 206, receiving at least one message encrypted using the session key from at least one network node within the network. Thus, in some embodiments, the session key received by the network nodes is used to encrypt a message to be sent from the network node (e.g. by processing apparatus, a computing system or a virtual machine) to the originating device.

In some cases, a single network node may send the message received at step 206. In other cases, multiple nodes may send messages encrypted with the session key, which messages are received by the originating device at step 206. At step 208, the method 200 further comprises selecting a network node from the at least one network node to which data will be replicated. In some embodiment, a single node may be selected for data replication while, in other embodiments, multiple nodes may be selected. The selection of a particular network node for replication is therefore based on whether or not that particular node is capable of encrypting a message using the session key.

A secure tunnel (e.g. a VPN) may be created between the originating device and the node to which data is to be replicated. To further improve security, one or more secure tunnels created between an origin and a replication node (e.g. a secure tunnel via which data is to be transmitted or replicated) may be temporary. In other words, a secure tunnel may expire after a defined duration. In some embodiments, the steps of encrypting 202 and broadcasting 204 may be performed in response to the expiration of at least one secure tunnel within the network. In this way, the list of network nodes to which data may be replicated can be refreshed regularly, such that the identification of suitable nodes takes account of any changes in policies.

Figure 3:
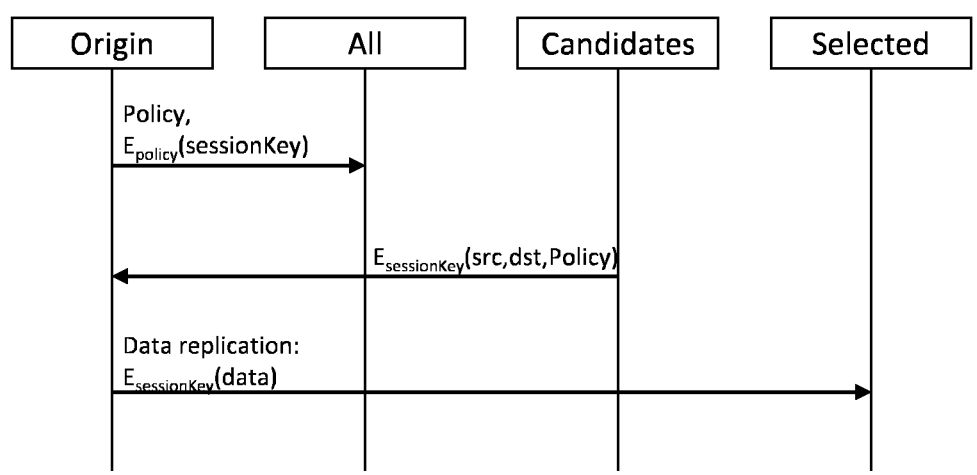
FIG. 3 is an illustration showing an example of an authenticated discovery protocol.

The method 200 described above is described with reference to a particular example with reference to FIG. 3. Various embodiments include a protocol, as depicted in FIG. 3. The protocol includes the following three steps:

The origin broadcasts the message: Policy, $E_{Policy}$(sessionKey) to "All" (i.e. all of the nodes in the network). The message in this example includes two concatenated parts: the first part is the policy itself, described in a machine-readable non-encrypted representation; and the second part is the ciphertext resulting from the encryption (E) of plaintext 'sessionKey', with public key 'Policy'.

The origin is the node that decides to replicate data, for example due to requirements regarding data query performance, load balancing and disaster recovery. In FIG. 1, the originating node is the node 102a.

Targets (i.e. the rest of the nodes in the network) receive the message broadcasted by the origin. All of the targets try to decrypt the broadcast message using their respective private keys and each node's reply may be one of the two values:

1. "Do not understand"

Such a response is sent by nodes which do not have the required keys to decrypt the message. This implicitly means that they do not satisfy the requested policy.

2. "OK, the data can be replicated here". The node sends to the originating device a message encrypted with the session key: $E_{sessionKey}$(src,dst,Policy). This response is given by nodes considered to be "Candidates". Here, 'src' is the source, and 'dst' is the destination, and the message message is the ciphertext resulting from an encryption (E) of the plaintext 'src, dst, policy' using key 'sessionKey'. Effectively, by sending this response, the node confirms that is able to decrypt the original message, and that it satisfies the policy (as it can use the 'sessionKey' key. The node also repeats where the request is coming from ('dst') and what the policy is, and explains who is sending the reply ('src').

Nodes that send this response do have the required keys to decrypt the broadcasted message. This implicitly means that they do satisfy the requested policy as asserted, for example, by various authorities who assign attributes to nodes.

The target sends to the origin an "OK" message and a message encrypted with the session key to show that it meets the requirements in the policy (e.g. that it is located in an allowed geographical location).

The originating device selects one or more nodes (e.g. computing systems/VMs) where the data will be replicated, these selected nodes referred to as "Selected" in FIG. 3. Next, the originating device sends the data to be replicated (e.g. sensitive data), encrypted with the session key proposed in the original message. Therefore, the message sent to the replication node or nodes is: $E_{sessionKey}$(data).

Figure 4:
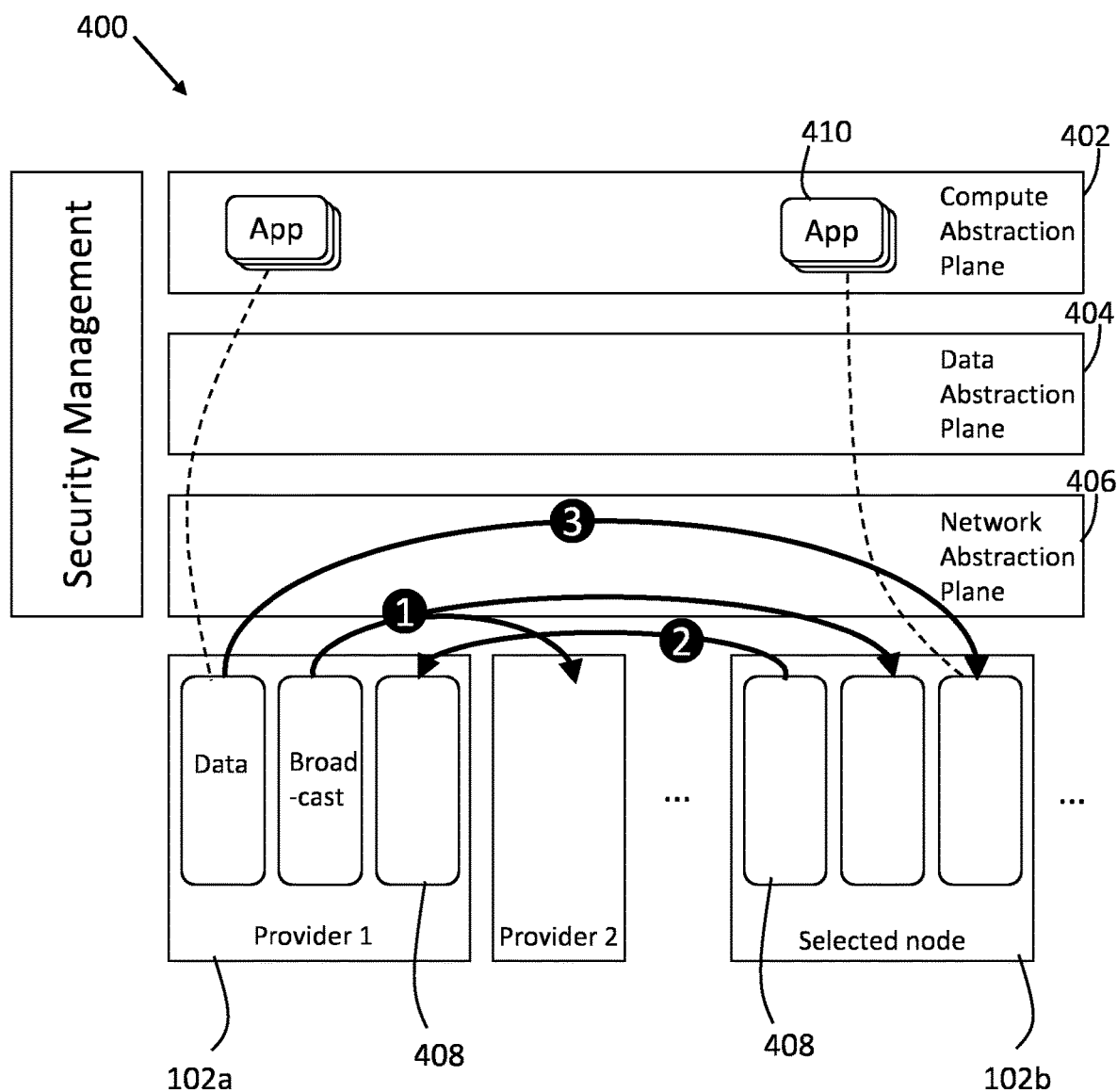
FIG. 4 is an illustration showing an example of a multi-cloud infrastructure.

The authenticated discovery protocol depicted in FIG. 3 may be integrated within a multi-cloud infrastructure 400, an example of which is depicted in FIG. 4. The infrastructure 400 is described in terms of a compute abstraction plane 402, a data abstraction plane 404 and a network abstraction plane 406. The integration includes deploying in every node (e.g. VM) 102 of a cloud computing platform a component which separately handles data replication. The component is referred to as a "Data replication service" 408. Such a component 408 is provided with a private key when necessary. This is present in the "Compute" plane 402 of the cloud platform. The "Data replication service" 408 triggers the authenticated discovery protocol and relies on the network plane 406 of the cloud platform for broadcasting the discovery message (the step indicated with a line labelled '1' in FIG. 4). Next, a "Data replication service" component 408 from each candidate node (e.g. VM) 102b-g answers (e.g. responds to) the discovery message (the step indicated with a line labelled '2' in FIG. 4). In step 3 of FIG. 4 (indicated by the line labeled '3'), the "Data replication service" 408 of the original device 102a sends the encrypted data to the selected node (e.g. VM) for replication. The arrow labelled 3 goes through the "Data abstraction plane" 404 and therefore, this plane needs to be aware of the replicated version of the data.

The process described in the example of FIG. 4 may be triggered when additional users are using an application (indicated by "App" 410) and therefore load-balancing is needed for a better performance of the system. For example, if many users are using a virtual machine at the same time, then the virtual machine may, at some point fail to handle the load. To prevent this, there multiple virtual machines may be used that each handle a part of the load.

In context: if our VM in the US is overloaded by many users from China, it makes sense to start up a new VM in China, replicate all the data to there and server the users there from closer by. That means finding a place where the data actually is allowed to be replicated.

The systems and methods described herein can deal with any type of data. The data that needs to be replicated may go through the following steps: packaging, encrypt package, transport package, decrypt package and finally un-packaging. For example, for a database, the proposed solution would require a dump of the portion of the database that is to be replicated (e.g. records and columns). Next, this dump file is encrypted, sent via the proposed authenticated discovery protocol to the place where the data will be replicated. Then the received encrypted package is decrypted by the receiving replication node (e.g. VM).

Within the architecture, a connected health system may be deployed as a cloud platform, such as U-cloud, and, therefore, may use the abstraction planes (compute, data, network) as depicted in FIG. 4. In FIG. 4 the steps: 1, 2, 3 can be mapped to the protocols steps described in FIG. 3 and, therefore, the steps of the method 200.

Figure 5:
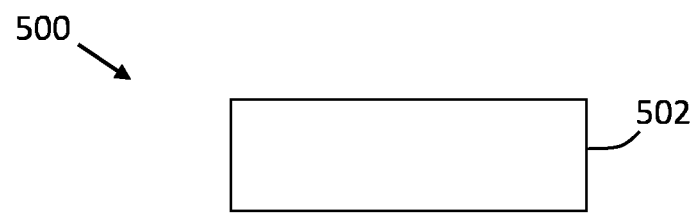
FIG. 5 is a flowchart showing a further example of a method, capable of being performed by an originating device, for identifying a network node within a network.

In the method 200 described above with reference to FIG. 2, the step 206 of receiving a message encrypted using the session key is performed only once a suitable candidate node is found. While one or more nodes may be able to respond to the message broadcasted by the originating device 102a, there may be one or more nodes which do not meet requirements in the policy and, therefore, are unable to respond to the originating device 102a. FIG. 5 is a flowchart showing an example of a method for identifying a network node within a network to which data will be replicated. Specifically, the method 500 describes an example of a process taking place at the originating device 102a when a network node is not able to respond to the originating device with an encrypted message. The method 500 may include the steps 202 to 208 of the method 200. The method 500 comprises receiving a message from a particular network node within the network other than the selected network node, the message indicating that the encrypted session key could not be decrypted by the particular network node. Thus, a network node which is unable to decrypt the session key broadcasted by the originating device may send a message to the originating device confirming that it is unable to decrypt the session key.

Figure 6:
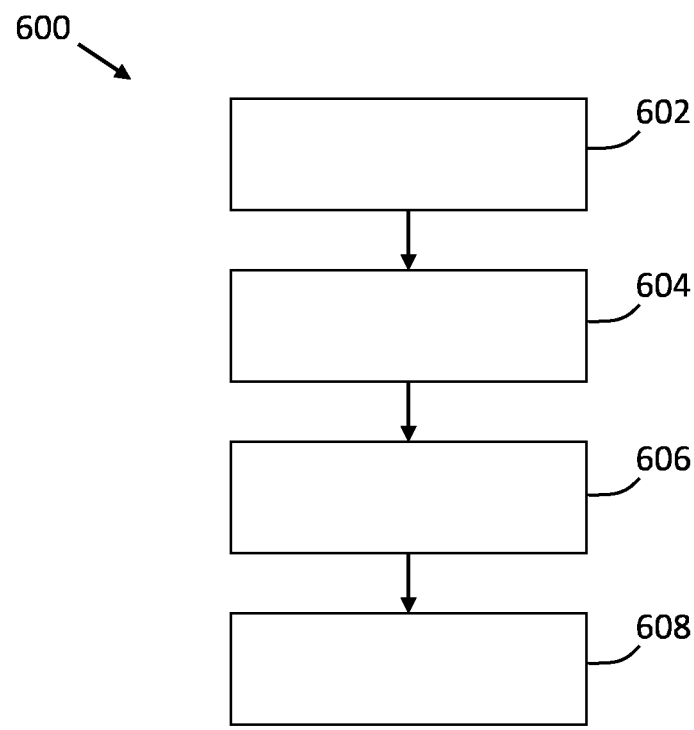
FIG. 6 is a flowchart showing an example of a method, capable of being performed by network node, for facilitating data replication within a network.

A network node 102b-g in a network 100 may perform various steps in response to a message being broadcast by an originating device 102. FIG. 6 is a flowchart showing an example of a method 600 for facilitating data replication within a network. The method 600 may be performed by processing apparatus at a network node. The method 600 comprises, at step 602, receiving a message from an originating device, wherein the message includes a session key that is encrypted according to an attribute-based encryption scheme. The message received may be, or include, the session key broadcast by the originating device during step 204 the method 200 above. The originating device may also be referred to as an originating device.

At step 604, the method 600 comprises attempting to decrypt the message using a policy key. A policy key is a secret key used in attribute-based encryption. Thus, the policy key may be referred to as a secret key. The policy key, in this example, is a secret key derived from a set of attributes, and the policy key is able to decrypt an attribute-based encryption ciphertext when the policy used for encryption matches these attributes.

The method comprises, at step 606, determining whether the attempt to decrypt the message was successful. At step 608, the method 600 comprises: responsive to determining that the attempt to decrypt the message is successful: encrypting a return message according to the policy key. At step 610, the method 600 comprises transmitting the return message to the originating device. Thus, if the network node receiving the message from the originating device is able to decrypt the message, then it sends an encrypted message (encrypted using the policy key) to the originating device. As noted above, the policy key is a private (secret) key which is generated according to a particular policy defining the requirements that must be met in order for a network node to replicate data from the originating device.

Figure 7:
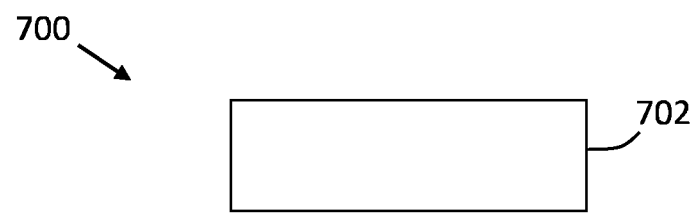
FIG. 7 is a flowchart showing a further example of a method, capable of being performed by network node, for facilitating data replication within a network.

The encrypting 608 and transmitting 610 steps of the method 600 are performed if the network node is capable of decrypting the message from the originating device. Network nodes which are not able to decrypt the message broadcast by the originating device may take no action, or may respond to the originating device in a different way. FIG. 7 is a flowchart of an example of a method 700 for facilitating data replication within a network. The method 700 may include one or more steps of the method 600. The method 700 comprises, at step 702, responsive to determining that the attempt to decrypt the message was unsuccessful: transmitting, to the originating device, an indication that decryption was unsuccessful.

As noted above with reference to the method 200, an attribute used for encrypting the session key comprises a geolocation policy specifying one or more geographic locations. The policy key may be specific to a geographic location in which the processing apparatus is located.

Figure 8:
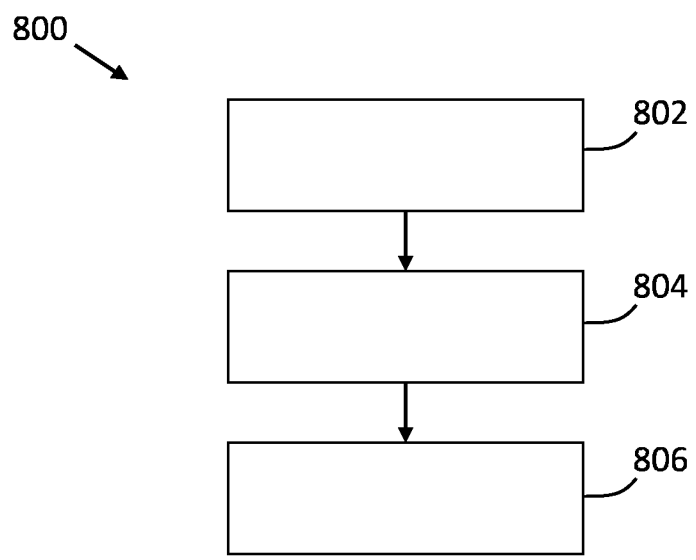
FIG. 8 is a flowchart showing a further example of a method, capable of being performed by network node, for facilitating data replication within a network.

FIG. 8 is a flowchart of an example of a method 800 for facilitating data replication within a network. The method 800 may include one or more steps of the methods 600 and 700. The method 800 may comprise, at step 802, identifying a key server assigned to the geographic location in which the processing apparatus is located. At step 804, the method 800 may comprise authenticating with the key server. The method 800 may comprise, at step 806, receiving the policy key from the key server. Thus, while, in some embodiments, one or more network nodes may possess a policy key, in other embodiments, a network node may communicate with a key server, such as a key server associated with the node, or associated with the location in which the node is located, and obtain a policy key from the key server.

Figure 9:
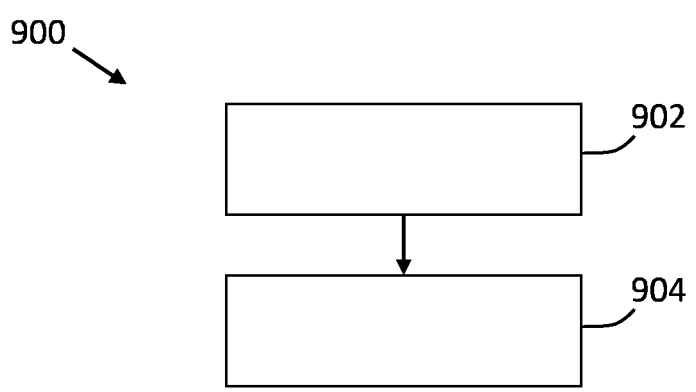
FIG. 9 is a flowchart showing a further example of a method, capable of being performed by network node, for facilitating data replication within a network.

A further example method 900 for facilitating data replication within a network is shown in the flowchart of FIG. 9. The method 900 may comprise one or more of the steps of the methods 600, 700 and 800. The method 900 comprises, at step 902, receiving data to be replicated from the originating device. At step 904, the method 900 may comprise storing the data to be replicated for later access. The replicated data may be stored in a storage medium associated with the network node. For example the replicated data may be stored in a storage device of a device located at the network node, or in a server associated with the node.

Figure 10:
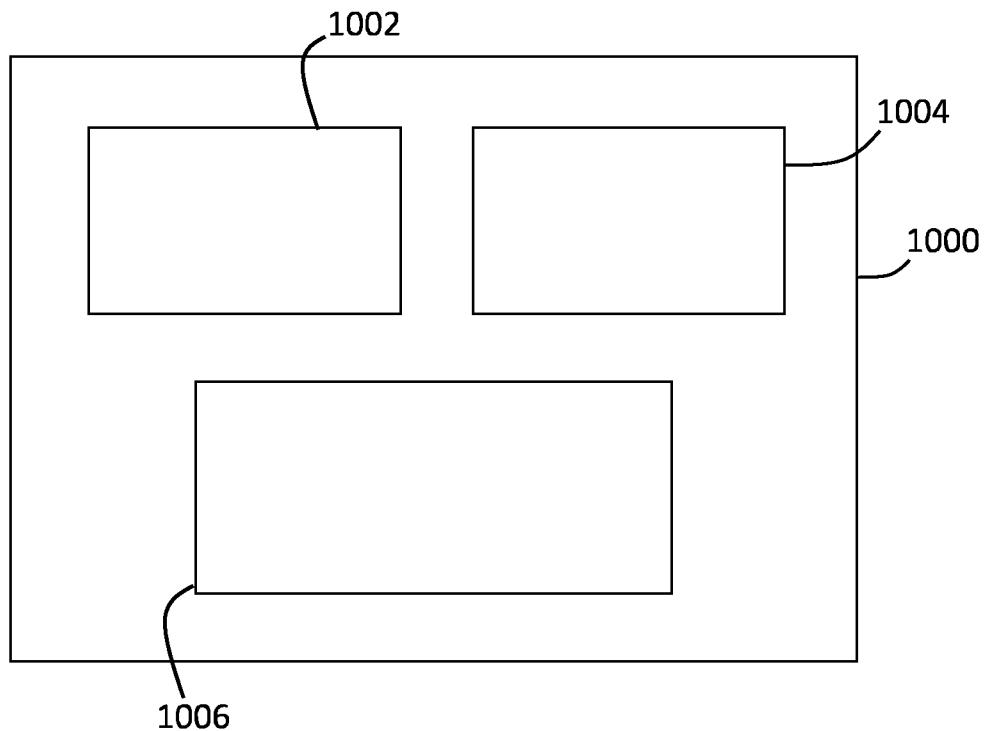
FIG. 10 is a simplified schematic of an example of apparatus for performing the methods described herein.

In addition to the methods described above, further aspects the invention relate to devices for performing the methods. FIG. 10 is a simplified schematic of an example apparatus, or device for performing the methods described above. The device 1000 comprises a communications interface 1002, a memory 1004 and a processor 1006. The device 1000 may, for example, comprise a computing device or a server. The processor 1006 may be configured to perform steps of the methods 200, 500 described above. In this way, the device 1000 may function as an originating device, or originating node 102a. The processor may alternatively be configured to perform steps of the methods 600, 700, 800, 900 described above. In this way, the device 1000 may function as a target, or destination node 102b-g (i.e. a node at which data is to be replicated, or at which a replication attempt may be made).

Figure 11:
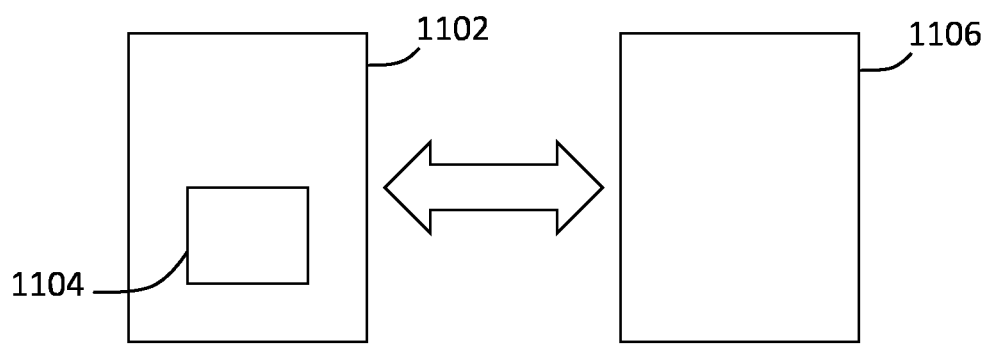
FIG. 11 is a simplified schematic of a non-transitory machine-readable medium and a processor.

A further aspect of the invention relates to a non-transitory machine-readable medium. FIG. 11 shows, schematically, a non-transitory machine-readable medium 1102 and a processor 1106. The non-transitory machine-readable medium 1102 is encoded with instructions 1104 for execution by the processor 1106. The non-transitory machine-readable medium comprises instructions for performing any of the methods 200, 500, 600, 700, 800 and/or 900 described above.

The systems and methods described herein perform a fast replication of data by using a shorter, and therefore faster, protocol. Known solutions which include three different protocol exchanges (discovery, authentication, key agreement) typically include more steps and are, therefore, slower. For example, a known solution protocol might include 9 steps.

In comparison with such a default solution protocol, the systems and methods described herein can achieve a better performance based, at least in part, on the fact that various embodiments embed discovery, authentication and key agreement in a single exchange, two-step protocol, which is more efficient. Various embodiments utilize only one protocol exchange, and this one exchange only has to be finished by server that satisfies the discovery broadcast. In various embodiments, the network node selected for replication authenticates itself to the originating device by being able to decrypt the discovery message that is sent by the origin. The decryption is based on getting a secret key from an attribute-based certification authority. In some embodiments, the attributes of a node selected for replication do not necessarily need to match the attributes in the policy exactly. For example, in an example where geolocation is used as an attribute in the policy, the location may not need to match the geolocation perfectly, since it is known that precise geolocation is difficult. A fuzzy approach may be used. For example, the node may be considered to be located at the he geolocation in the policy if the node is within 50 kilometers of the defined geolocation.

Replication in a multi-cloud system, appended with other local hospital servers, may require integration between different types of systems, for example using Transport Layer Security (TLS) protocols. Such a requirement is removed by various embodiments described herein. The newly inserted platform-independent protocol described herein integrates easily with heterogeneous (e.g. multi-cloud scenarios) systems because it does not rely on close integration between the computing providers. Various embodiments are based only on exchange of encrypted content and peer-to-peer connected nodes (e.g. VMs) without relying on possible communications and specifics deployed for the multi-cloud system. For example, the discovery phase relies on just sending an encrypted message which is not platform-dependent.

Various embodiments use a discovery process that is relevant to the current topology at the time of running the protocol, therefore automatically taking into account dynamic changes that may have occurred in the past. Furthermore, various embodiments allow decentralized discovery of places (where data is allowed to be replicated) without the need of having a central entity that orchestrates this discovery.

Various embodiments do not need to trust the cloud or even a possible multi-cloud deployment that the clouds/ multi-cloud system will trustily enforce all the Service Level Agreements (SLAs) and use only the allowed geographical regions for replication. Furthermore, for the geolocation attribute-based encryption authentication, the fuzzy authentication approach can split the trust between different certificate authorities or semi-trusted landmarks which release secret keys for different geolocation measurements (e.g. ping, hops, etc.). As noted above, the trust may be dissipated even more by the use of expiration dates on the secure tunnels created between an origin and a replication node. When a secure tunnel expires a new key is negotiated. In this way, the security of the discovery process is enhanced. Furthermore this expiration triggers a discovery process which might reveal better (e.g. closer) replication nodes.

Various embodiments move the trust from a mesh of clouds, their security solutions, integration of the security solutions, SLAs and collaboration SLAs to trusting a clear protocol. The simplicity and clarity of the protocol minimizes the attack surface. This moves the trust to the certification authorities and the key generation authorities.

Using a single certification authority that is fully trusted by all users and that reliably monitors user attributes is reasonable in small systems. However, for large and distributed systems, such as a connected health system, this may not be the case. Multi-Authority Key Generation Systems (MA-KGS) have been proposed to tackle this problem. In these systems, the task of generating parts of a user's secret keys relating to particular attributes is performed by so-called Key Generation Authorities (KGAs). Apart from a system-wide public key generated by a certification authority, each Key Generation Authority generates attribute public keys for each of its attributes. The user requests secret key parts from each KGA for (a subset of) the attributes for which it is responsible. In some systems, the user may also first request a user secret key from the certification authority. The user integrates the pieces of the secret keys received from all the KGAs into one secret key. Therefore, a malicious KGA can issue secret keys for limited number of attributes. However, if the key material of a KGA gets compromised, then this still poses a risk because this material can then be combined with other user secret keys to obtain access to material that otherwise would not be accessible.

For reducing the risk that the key material of the KGA gets compromised, thereby reducing the level of trust in KGAs that is needed, a Multi-Authority Key Generation System may be used. In such a system (depicted, for example, in FIG. 4), the user must receive secret keys from multiple KGAs in order to be able to decrypt the discovery message. These secret keys are associated with different subsets of geolocation attributes (e.g. ping time, hops number, IP address, DNS). A secure distributed key generation solution could also be leveraged for providing the replication nodes with the secret keys.

Various embodiments can be used when replication of data is needed and when this data should be replicated only in allowed locations. The methods and systems described herein can be generalized for just authenticated discovery, since it allows agreeing on a key by sending the encrypted key to the place where the data needs to be replicated. The encryption can be done using attributes that are different from geolocation and fuzzy authentication can be leveraged.

Various embodiments do not rely on developing new integrated solution between the computing providers (e.g. cloud providers, hospital server), but only on cryptographic protocols which are platform independent.

As noted above, according to various embodiments, a non-transitory medium (e.g. a volatile or non-volatile memory) may be encoded with instructions for execution by a processor (e.g., a microprocessor or other similar hardware device) for performing the functionality described herein. For example, such instructions may correspond, at least in part, to the following pseudocode:

```
Origin:
    replReqID = random identifier number;
    Policy = get_geolocation_requirement(plaintext);
    sessionKey = generate fresh session key;
    discovery_message= (replReqID, Policy, sessionKey);
    ciphertext = fuzzy_encrypt(Policy, discovery_message);
    broadcast (policy,ciphertext); //(network level/plane)
Targets:
    (policy, ciphertext) = received_broadcast( );
    geolocation = fetch known geolocation from cloud provider;
    if (geolocation in policy) {   //policy example: TODO later
        abeSecretKey = get secret key from Key Generation Authority;
        (repReqID, Policy, sessionKey) = fuzzy_decrypt(ciphertext);
        response=(src, dst, Policy);
            //where src = source, dst = destination
encrypted_response = encrypt(sessionKey, response)
send_to_origin(encrypted_response);
}
Origin:
    responses = receive encrypted responses;
        //decrypt responses and get list of candidates;
    candidates_VMs = decrypt(sessionKey, responses);
        //select randomly from those who correctly
//decrypted the discovery message
selected_VMs = select VMs where to replicate the data;
    encrypted_data = encrypt(sessionKey, data);
    send_to_selected_VMs(encrypted_data)
Targets:
    encrypted_data = receive encrypted replicated data;
    data = decrypt(sessionKey, encrypted_data);
```

It should be apparent from the foregoing description that various example embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a device for identifying a network node within a network to which data will be replicated, the method comprising:
encrypting, at an originating node of the network, a session key according to an attribute-based encryption scheme, wherein an attribute used for encrypting the session key comprises a geolocation policy specifying one or more geographic locations as being a location where the data is allowed to be replicated, and/or a location where the data is not allowed to be replicated;
broadcasting, from the originating node, a message including an encrypted session key within the network;
receiving, in response to the broadcast message, at least one response message encrypted using a session key from at least one network node within the network; and
selecting a network node from the at least one network node to which data will be replicated based on the selected network node being capable of decrypting a broadcast message and further capable of encrypting a response message using the session key, wherein the network node receiving the broadcast message comprises a policy key capable of decrypting the broadcast message, and is further configured to generate the received at least one response message encrypted using the session key decrypted using the policy key;
wherein the policy key is specific to a geographic location where the selected network node is located.

2. The method of claim 1, wherein the at least one network node comprises at least one virtual machine.

3. The method of claim 1, further comprising:
receiving a response message from a particular network node within the network other than the selected network node, the message indicating that the encrypted session key could not be decrypted by the particular network node.

4. The method of claim 1, wherein the steps of encrypting and broadcasting are performed in response to the expiration of at least one secure tunnel within the network.

5. A device comprising a communications interface, a memory, and a processor configured to perform the method according to claim 1.

6. A non-transitory machine-readable medium encoded with instructions for execution by a processor, the non-transitory machine-readable medium comprising instructions for performing the method according to claim 1.

7. A method, performed by processing apparatus at a network node, for facilitating data replication within a network, the method comprising:
receiving a message from an originating device, wherein the received message includes a session key that is encrypted according to an attribute-based encryption scheme, wherein an attribute used for encrypting the session key comprises a geolocation policy specifying one or more geographic locations as being a location where the data is allowed to be replicated, and/or a location where the data is not allowed to be replicated;
attempting to decrypt the received message using a policy key;
determining whether the attempt to decrypt the received message was successful; and
responsive to determining that the attempt to decrypt the received message was successful:
encrypting a return message with the session key; and
transmitting the encrypted return message to the originating device to indicate a capability of decrypting the received message from the originating device;
wherein the policy key is specific to a geographic location where the selected network node is located.

8. The method of claim 7, further comprising:
responsive to determining that the attempt to decrypt the message was unsuccessful:
transmitting, to the originating device, an indication that decryption was unsuccessful.

9. The method of claim 8, further comprising:
identifying a key server assigned to the geographic location in which the processing apparatus is located;
authenticating with the key server; and
receiving the policy key from the key server.

10. The method of claim 7, further comprising:
receiving data to be replicated from the originating device; and
storing the data to be replicated for later access.

* * * * *